Oct. 19, 1954    H. G. KLEMM    2,692,008
RETRACTABLE TRACTOR SEAT
Filed Sept. 25, 1948    2 Sheets-Sheet 1

INVENTOR.
HERMAN G. KLEMM
BY
Carlson, Pitzner, Hubbard & Wolfe
ATTORNEYS

Oct. 19, 1954  H. G. KLEMM  2,692,008
RETRACTABLE TRACTOR SEAT
Filed Sept. 25, 1948  2 Sheets-Sheet 2

INVENTOR.
HERMAN G. KLEMM
BY
ATTORNEYS

Patented Oct. 19, 1954

2,692,008

UNITED STATES PATENT OFFICE 2,692,008

RETRACTABLE TRACTOR SEAT

Herman G. Klemm, Birmingham, Mich., assignor to Harry Ferguson, Inc., Detroit, Mich., a corporation of Delaware Application September 25, 1948, Serial No. 51,156

3 Claims. (Cl. 155—51)

The invention relates to seats for agricultural vehicles or implements, and more particularly to an improved seat for tractors of the agricultural type.

Tractors of the above general character ordinarily consist of an elongated narrow body supported at its rear end on large drive wheels and at its front end on steerable front wheels. The latter are controlled by a steering wheel usually located somewhat rearwardly of the center of the tractor body. A seat is provided at the rear of the tractor body in a position such that the steering wheel and control instrumentalities of the tractor are within convenient reach of the operator while seated.

In the operation of such tractors it is often desirable and sometimes necessary for the operator to stand up on the tractor body. It has therefore been the practice to construct the seats so that they can be folded back to provide foot room for the operator on the tractor body. With the seats heretofore constructed, it has been necessary for the operator to stop the tractor and to dismount therefrom in order to fold back the seat, as its close proximity to the steering wheel does not afford sufficient clearance for the operator on the tractor while the seat is being folded back.

With the above in view, the primary object of the invention is to provide an improved tractor seat which can be folded and swung into an out-of-the-way position easily and with complete safety while the tractor is running and the operator riding thereon.

Another object is to provide a supporting structure for tractor seats which allows the seat to be swung into a substantially inverted position in which it is effectually protected against rain or snow, thereby maintaining the seat in instantly usable condition when the tractor is parked out of doors in inclement weather.

A further object is to provide a practical and efficient hinge structure for tractor seats which while simple in construction, light in weight and inexpensive to manufacture, is operative to support the seat rigidly against any lateral or tipping movements while occupied by the tractor operator, and which is capable of giving long and trouble-free service under the hard usage to which such structures are commonly subjected.

Other objects and advantages of the invention will become apparent from the following detailed description of the preferred embodiment illustrated in the accompanying drawing, in which.

Figure 1:
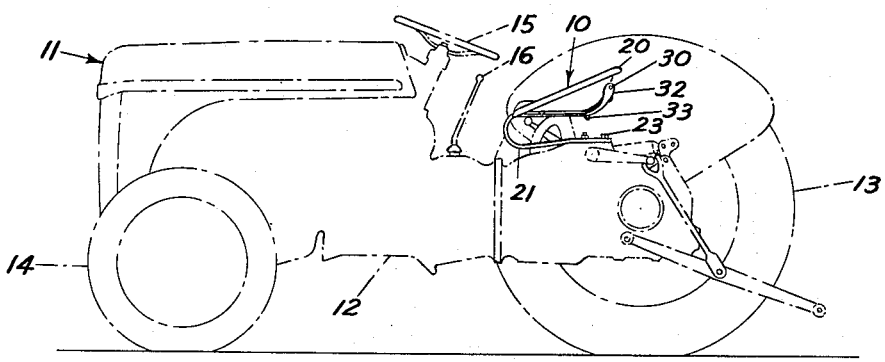
Figure 1 is a side elevational view of a tractor in outline equipped with an operator's seat embodying the features of the invention.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration the improved operator's seat indicated generally at 10 has been shown as installed in a conventional lightweight tractor 11. This tractor comprises an elongated narrow body 12 supported at its rear end on drive wheels 13 and at its front end on steerable front wheels 14. The latter wheels are manipulated by a steering wheel 15 mounted on the tractor body, in this instance somewhat to the rear of the center of the body. The various control instrumentalities for the tractor, including the shift lever 16, are grouped closely around the steering wheel. The seat 10 is located rearwardly of and in close proximity to the steering wheel 15 so that the wheel and controls are within easy reach of the operator while seated. In practice the top wall of the body 12 adjacent the front edge of the seat and immediately below it is shaped to provide a platform upon which the operator may stand while operating the tractor, if desired.

Figure 4:
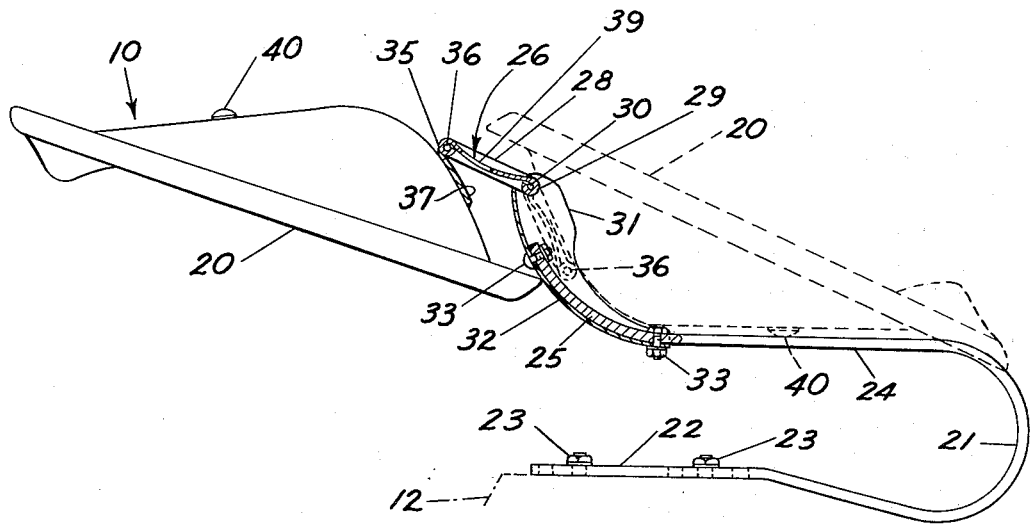
Fig. 4 is a fragmentary partly-sectioned side view of the seat and supporting structure, showing the seat swung into fully retracted position.

The seat 10 in its preferred form comprises a seat pan 20 with supporting structure therefor including an elongated resilient supporting member 21 attached to the tractor body and connecting means securing the seat pan to the supporting member in a manner permitting movement between the normal or operative position in which it is shown in Fig. 1, and the retracted or out-of-the-way position in which it is shown in Fig. 4. The seat pan 20 may be of the conventional bucket type and preferably comprises a sheet-metal stamping. The resilient member 21, as herein shown, comprises a flat spring-like steel bar of generally U-shaped configuration. One leg 22 of the bar is secured to the tractor body as by bolts 23 with the loop thereof opening rearwardly, and the other leg 24 is arranged to carry the seat pan 20.

In the exemplary seat structure the leg 22 of the supporting member is formed with a straight end portion adapted to rest on an elevated part of the tractor body, as shown in Fig. 1, leaving the looped portion of the member freely disposed for movement in a vertical plane whereby the over-all resiliency of the support is increased. When the supporting member 21 is thus attached to the tractor body, the leg 24, which is formed with a straight intermediate portion and an upwardly curved rear end portion 25, is disposed generally parallel to and spaced upwardly from the tractor body.

In accordance with the invention, the seat pan 20 is mounted on and secured to the supporting member 21 in a novel manner which provides for a dual or two-step movement of the pan from the normal operative position to the retracted or out-of-the-way position. More particularly, the arrangement is such that the initial movement of the pan is in a generally rearward direction, that is, away from the steering wheel, thereby substantially increasing the clearance between the front edge of the pan and the steering wheel. The second step of the retracting movement is a pivoted or swinging movement whereby the seat pan is folded back to fully retracted position, leaving the rear portion of the tractor body unobstructed so that an operator may conveniently stand thereon while driving the tractor.

In order to move the seat pan to retracted position it is only necessary for the operator to rise slightly from the seat, the tractor body providing sufficient foot room so that this can be done conveniently while the seat pan is in normal position. The seat pan may then be shifted rearwardly in its first-step movement by grasping its rear edge and pulling it upwardly and rearwardly. Sufficient clearance is then available so that the pan may be swung or folded to its fully retracted position without interference from the operator. Accordingly, the changeover of the seat from operative to retracted position may be effected very quickly and easily and with complete safety, without requiring the operator to stop the tractor and dismount therefrom.

Figure 3:
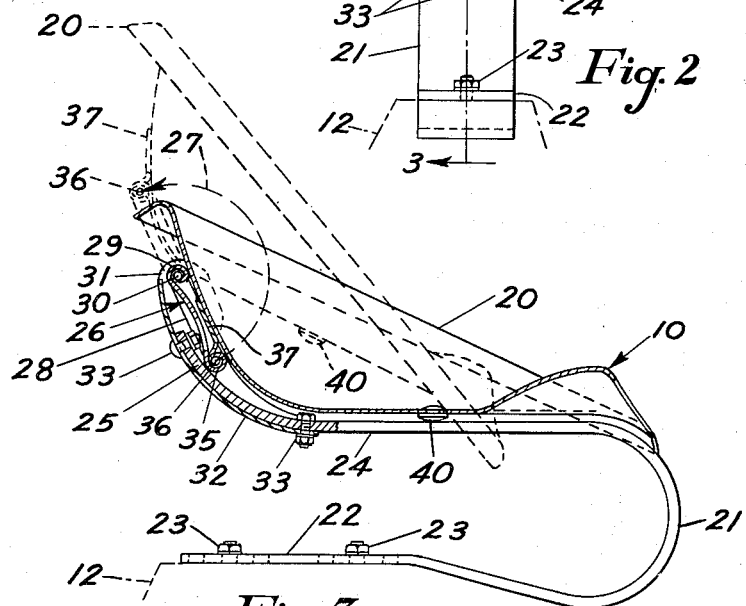
Fig. 3 is a sectional view of the seat and supporting structure taken in a vertical plane substantially on the line 3—3 of Fig. 2.

The novel dual or two-step retracting movement of the seat pan 20 is attained in the present instance by utilizing in the connection between the pan and the supporting member 21 a double-jointed hinge structure. This hinge structure includes a hinge member 26 pivotally mounted on the member 21 to swing about a horizontal axis disposed transversely of the tractor body. The member 26 also has a pivotal connection with the seat pan permitting independent relative pivoting movement between the pan and hinge member about an axis parallel to and spaced from said first-mentioned axis. With this arrangement, the seat pan is shifted generally rearwardly by rocking the hinge member 26 about its pivot on the supporting member 21 wherein the free end of the hinge member traverses the arcuate path indicated by the broken line 27 in Fig. 3 and the seat pan moves from the position in which it is shown in full lines to the position in which it is shown in broken lines in that figure.

After its rearward movement as above described, the seat pan is swung about its pivot on the hinge member while the latter continues on to the limit position in which it is shown in Fig. 4. In this movement the seat pan is substantially inverted and when fully retracted it hangs from the hinge member well to the rear of the tractor body and in a position such that its inner or seating surface is effectually protected from rain or snow.

In the exemplary seat structure, the hinge member 26 comprises a generally rectangular metal plate having upstanding stiffening flanges 28 at opposite sides. At one end of the plate the edge portion is curled over to form a bearing 29 for the reception of a pivot pin 30 which in this instance is supported between upstanding laterally spaced side flanges 31 of a bracket 32. The bracket 32 may be conveniently formed as a sheet metal stamping and, as shown in Fig. 4, the body portion is formed to fit over the curved end portion of the supporting member 21 and is secured thereto as by bolts 33. In this instance the flanges 31 are extended upwardly beyond the end of the bracket and the extensions are suitably apertured to receive the ends of the pin 30. The upper edge of the bracket body is thus enabled to serve as a stop for determining the limit position of the hinge member 26 (see Fig. 4).

At its other or free end, the hinge plate 26 is formed with a relatively short centrally disposed curl 35 constituting a bearing adapted to receive a pivot pin 36 which has its opposite ends engaged with appropriately shaped portions of a seat bracket 37. The latter bracket is shaped to conform to the bottom of the seat pan 20 and is rigidly secured thereto in any suitable manner, as by spot-welding. For cooperation with the hinge plate 26, one edge of the bracket is notched so as to straddle the bearing curl 35 of the hinge plate and the side portions of the bracket are curled over to embrace the pin 36.

Figure 2:
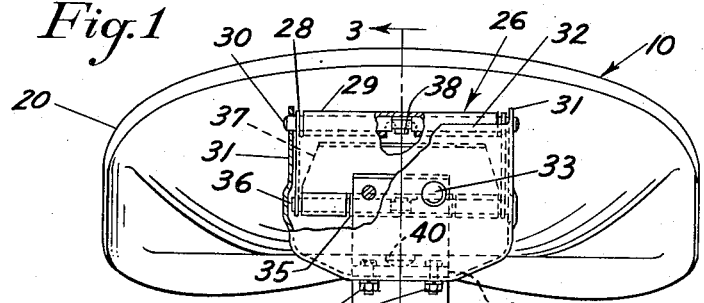
Fig. 2 is a partly sectioned rear view of the operator's seat and the seat-supporting structure.

Simple, yet effective means is provided for retaining the pins 30 and 36 in assembled relation with the hinge plate 26 and associated elements. For that purpose each of the pins is formed with a central peripheral groove and the curled portions of the plate are slotted to form tongues 38 adapted to be pressed into the grooves as shown in Fig. 2. The tongues are thus effective to restrain the pins against endwise movement and eliminate the need for cotter keys or similar securing means.

It will be observed by reference to Fig. 2 of the drawing, that the hinge plate 26 and supporting bracket 32 are substantially wider than the supporting member 21 and thus provide relatively long bearings for the hinge pins 30 and 36. Bolt clearance holes 39 in the hinge plate 26 permit the plate to lie flush against the end portion 25 of the supporting member and below the upper edges of the flanges 31 of the bracket 32. The flanges are shaped to conform generally to the contour of the seat pan but are dimensioned to afford clearance for the rear portion of the pan when in operative position. Support for the forward end of the seat pan is provided by a bumper 40 of rubber or other suitable material fixed to the underside of the pan and adapted to rest on the straight leg portion of the supporting member 21.

The long bearings for the hinge member, together with the widely spaced rest provided by the bracket 37, effectually prevent any sidewise movement or tipping of the seat pan 20 which thus provides a safe, firm seat for the tractor operator. The novel hinge structure permits the operator to shift the seat pan to an out-of-the-way position without stopping the tractor or dismounting therefrom.

I claim as my invention:

1. An operator's seat for tractors or the like comprising, in combination, a seat pan, a member for supporting said pan, means connecting said seat pan to said supporting member for two-step movement from a normal operative position to a retracted position, said connecting means including a bracket secured to said member, a second bracket secured to said seat pan, transversely disposed pivot pins carried by said brackets, a hinge plate having the edge portions at opposite ends curled to form bearings for receiving said pivot pins, each of said pins being formed with a peripheral groove, and tongues formed in the curled portions of said bearing plate engaging in the grooves in the respective pins to restrain the pins against endwise movement.

2. An operator's seat for a tractor comprising, in combination, a support member mountable on the tractor, a seat pan, an elongated hinge member, means pivotally connecting the forward end of said hinge member at substantially the rear portion of said seat pan, means pivotally connecting the rear end of said hinge member at substantially the rear edge of said support member, the forward portion of said seat pan being disposed to rest on said support member when in its normal position but being free of connection with said support member, whereby said hinge member may be rocked about its rear end to retract said pan relative to said support member and the seat pan then rocked about the forward end of said hinge member to a substantially inverted position extending rearwardly of said support member.

3. An operator's seat for a tractor or the like comprising, in combination, a seat pan, a support for said pan including a generally U-shaped spring bar having a lower leg rigidly secured to the tractor and an upper leg disposed above and in rearwardly extending relation to the tractor, a first bracket secured to the underside of said pan adjacent the rear edge thereof, a second bracket secured to the top side of said upper leg adjacent the rear edge thereof, a hinge place having its opposite ends curled to define bearings, a first pivot pin inserted through said first bracket and the bearing at the forward end of said hinge plate, a second pivot pin inserted through said second bracket and the bearing at the rear end of said hinge plate, the forward portion of said seat pan being disposed to rest upon the forward portion of said upper leg but being free of connection with the latter, whereby (a) said hinge plate may be rocked about said second pin to partially retract said pan and (b) said pan may then be rocked about said first pin to a substantially inverted position extending rearwardly of said upper leg.

References Cited in the file of this patent

UNITED STATES PATENTS

| Number | Name | Date |
|---|---|---|
| 57,619 | Bergen | Aug. 28, 1866 |
| 533,300 | Josselyn | Jan. 29, 1895 |
| 2,298,450 | Baker | Oct. 13, 1942 |
| 2,411,125 | Borsheim | Nov. 12, 1946 |
| 2,563,277 | Roeder | Aug. 7, 1951 |
| 2,598,384 | Huber | May 27, 1952 |

FOREIGN PATENTS

| Number | Country | Date |
|---|---|---|
| 287,277 | Great Britain | Mar. 22, 1928 |